(12) United States Patent
Ji et al.

(10) Patent No.: US 8,343,452 B2
(45) Date of Patent: Jan. 1, 2013

(54) ACRYLIC FIBER BONDED CARBON FIBER PAPER AS GAS DIFFUSION MEDIA FOR FUEL CELL

(75) Inventors: Chunxin Ji, Pennfield, NY (US); Gerald J. Fleming, Wolfeboro, NH (US); Margaret Fleming, legal representative, Wolfeboro, NH (US); Mark Mathias, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2139 days.

(21) Appl. No.: 11/384,706

(22) Filed: Mar. 20, 2006

(65) Prior Publication Data

US 2007/0218346 A1 Sep. 20, 2007

(51) Int. Cl.
*H01M 4/86* (2006.01)
*H01M 4/88* (2006.01)
*H01M 4/96* (2006.01)
*H01M 8/02* (2006.01)
*H01M 8/10* (2006.01)

(52) U.S. Cl. ............. 423/447.2; 429/521; 429/523; 429/535; 428/408

(58) Field of Classification Search ............. 429/44, 429/521, 523, 535; 428/408; 423/447.2
See application file for complete search history.

(56) References Cited

U.S. PATENT DOCUMENTS

| | | | |
|---|---|---|---|
| 3,985,578 A | 10/1976 | Witherspoon et al. | |
| 5,272,017 A | 12/1993 | Swathirajan et al. | |
| 5,316,871 A | 5/1994 | Swathirajan et al. | |
| 5,624,769 A | 4/1997 | Li et al. | |
| 5,648,027 A * | 7/1997 | Tajiri et al. | 264/43 |
| 5,776,624 A | 7/1998 | Neutzler | |
| 6,277,513 B1 | 8/2001 | Swathirajan et al. | |
| 6,350,539 B1 | 2/2002 | Wood, III et al. | |
| 6,372,376 B1 | 4/2002 | Fronk et al. | |
| 6,376,111 B1 | 4/2002 | Mathias et al. | |
| 6,521,381 B1 | 2/2003 | Vyas et al. | |
| 6,524,736 B1 | 2/2003 | Sompalli et al. | |
| 6,566,004 B1 | 5/2003 | Fly et al. | |
| 6,663,994 B1 | 12/2003 | Fly et al. | |
| 6,793,544 B2 | 9/2004 | Brady et al. | |
| 6,794,068 B2 | 9/2004 | Rapaport et al. | |
| 6,811,918 B2 | 11/2004 | Blunk et al. | |
| 6,824,909 B2 | 11/2004 | Mathias et al. | |
| 7,510,626 B2 | 3/2009 | Hamada et al. | |
| 2004/0009384 A1 | 1/2004 | Mathias et al. | |
| 2004/0096709 A1 | 5/2004 | Darling et al. | |
| 2004/0137311 A1 | 7/2004 | Mathias et al. | |
| 2005/0026012 A1 | 2/2005 | O'Hara | |
| 2005/0026018 A1 | 2/2005 | O'Hara et al. | |
| 2005/0026523 A1 | 2/2005 | O'Hara et al. | |
| 2005/0042500 A1 | 2/2005 | Mathias et al. | |
| 2005/0058869 A1 | 3/2005 | Mathias et al. | |
| 2005/0079403 A1 * | 4/2005 | Lipka et al. | 429/44 |
| 2005/0084742 A1 | 4/2005 | Angelopoulos et al. | |
| 2005/0100774 A1 | 5/2005 | Adb Elhamid et al. | |
| 2005/0112449 A1 | 5/2005 | Mathias et al. | |
| 2008/0038589 A1 | 2/2008 | Nakamura et al. | |

FOREIGN PATENT DOCUMENTS

| CN | 1734812 A | | 2/2006 |
|---|---|---|---|
| JP | 02184510 A | * | 7/1990 |

OTHER PUBLICATIONS

Mathias, et al., Diffusion media for PEM fuel cells, Handbook of Fuel cells,—Fundamentals Technology and Applications, 2003.

* cited by examiner

*Primary Examiner* — Gregg Cantelmo
(74) *Attorney, Agent, or Firm* — John A. Miller; Miller IP Group, PLC

(57) ABSTRACT

A gas diffusion media for a fuel cell, such as a proton exchange membrane fuel cell, is provided. The gas diffusion media includes carbonizable acrylic pulp fibers instead of conventional phenolic resin as a binder material. The acrylic fibers are mixed with the carbon fiber dispersion during the papermaking step, thus eliminating the phenolic resin impregnation step typically associated with conventional gas diffusion media manufacturing processes. The mat is then cured and carbonized to produce gas diffusion media.

22 Claims, 5 Drawing Sheets

ACRYLIC FIBER BONDED CARBON FIBER PAPER AS GAS DIFFUSION MEDIA FOR FUEL CELL

BACKGROUND OF THE INVENTION

1. Field of the Invention

The present invention relates generally to fuel cell systems, and more particularly to new and improved gas diffusion media for use in Proton Exchange Membrane (PEM) fuel cell systems.

2. Discussion of the Related Art

Fuel cells have been used as a power source in many applications. For example, fuel cells have been proposed for use in electrical vehicular power plants to replace internal combustion engines. In proton exchange membrane (PEM) type fuel cells as well as in other fuel cell types, hydrogen is supplied to the anode of the fuel cell and oxygen is supplied as the oxidant to the cathode. A typical PEM fuel cell and its membrane electrode assembly (MEA) are described in commonly-assigned U.S. Pat. Nos. 5,272,017 and 5,316,871, the entire specifications of which are incorporated herein by reference.

PEM fuel cells include a membrane electrode assembly (MEA) comprising a thin, proton transmissive, non-electrically conductive solid polymer electrolyte membrane having the anode catalyst on one of its faces and the cathode catalyst on the opposite face. PEM.fuel cells usually employ bipolar plates with channels on either side for the distribution of reactants over the electrode (i.e., anode and cathode) catalyst layer surfaces. Gas diffusion media (also known as gas diffusers or gas-diffusion backings) are provided between each face of the catalyst-coated proton exchange membrane and the bipolar plates. The region between reactant channels consist of lands, also known as ribs. Accordingly, in this type of design, roughly half of the electrode area is adjacent to the ribs and half is adjacent to the lands. The role of the gas diffusion media is to transition the anode and cathode gases from the channel-rib structure of the flow field to the active area of the electrode with minimal voltage loss. Although all of the current passes through the lands, effective diffusion media promote a uniform current distribution at the adjacent catalyst layers.

Examples of technology related to PEM and other related types of fuel cell systems can be found with reference to commonly-assigned U.S. Pat. No. 3,985,578 to Witherspoon et al.; U.S. Pat. No. 5,624,769 to Li et al.; U.S. Pat. No. 5,776,624 to Neutzler; U.S. Pat. No. 6,277,513 to Swathirajan et al.; U.S. Pat. No. 6,350,539 to Wood, lll et al.; U.S. Pat. No. 6,372,376 to Fronk et al.; U.S. Pat. No. 6,376,111 to Mathias et al.; U.S. Pat. No. 6,521,381 to Vyas et al.; U.S. Pat. No. 6,524,736 to Sompalli et al.; U.S. Pat. No. 6,566,004 to Fly et al.; U.S. Pat. No. 6,663,994 to Fly et al.; U.S. Pat. No. 6,793,544 to Brady et al.; U.S. Pat. No. 6,794,068 to Rapaport et al.; U.S. Pat. No. 6,811,918 to Blunk et al.; U.S. Pat. No. 6,824,909 to Mathias et al.; U.S. Patent Application Publication Nos. 2004/0009384 to Mathias et al.; 2004/0096709 to Darling et al.; 2004/0137311 to Mathias et al.; 2005/0026012 to O'Hara; 2005/0026018 to O'Hara et al.; 2005/0026523 to O'Hara et al.; 2005/0042500 to Mathias et al.; 2005/0084742 to Angelopoulos et al.; 2005/0100774 to Abd Elhamid et al.; and 2005/0112449 to Mathias et al., the entire specifications of all of which are expressly incorporated herein by reference.

The gas diffusion media provide reactant gas access from the flow field channel to the catalyst layers, provide a passage for removal of product water from the catalyst layer area to the flow field channels, provide electronic conductivity from the catalyst layers to the bipolar plates, provide for efficient heat removal from the MEA to the bipolar plates where coolant channels are located and provide mechanical support to the MEA in case of large reactant pressure difference between the anode and cathode gas channels. The above functions impose electrical and thermal conductivity requirements on the diffusion media including both the bulk properties and the interfacial conductivities with the bipolar plates and the catalyst layers. Due to the channel-rib structure of the bipolar plates, the gas diffusion media also allow gas access laterally from the channels to the catalyst area adjacent to the lands to allow for electrochemical reaction there. The gas diffusion media also promote water removal laterally from the catalyst area adjacent to the land out to the channel. The gas diffusion media also provide electronic conductivity laterally between the bipolar plate land and the catalyst layer adjacent to the channel, and maintains good contact with the catalyst layer for electrical and thermal-conductivity and must not compress into the channels resulting in blocked flow and high channel pressure drops.

State-of-the-art diffusion media in proton-exchange-membrane (PEM) fuel cells consist of carbon fiber mats, often called carbon fiber paper. These papers use precursor fibers made typically from polyacrylonitrile, cellulose, and other polymeric materials. The processing consists of forming the mat, adding a resin binder, curing the resin with the material (sometimes done under pressure and called molding), and progressively heating the material under inert atmosphere or vacuum to remove non-carbonaceous material. The final step in making the material is a high temperature heat treatment step that approaches or exceeds 1,600° C. reaching as high as 2,800° C. in some cases. This step is done in an inert gas (e.g., nitrogen or argon) or a vacuum environment, and the purpose is to remove non-carbonaceous material and, when the temperature is taken to approximately 2,000° C. or above, convert the carbon into graphite. This step can be done continuously or in batch furnaces using stacks of square sheets of carbon fiber paper, usually one meter square. Converting the carbon to graphite results in superior electrical conductivity that has typically been understood to be ideal for use in PEM fuel cells. Carbon fiber papers are also used as gas diffusion electrodes in phosphoric acid fuel cell (PAFC) applications. In that application, the material must be graphitized in order to have sufficient corrosion resistance to withstand the hot phosphoric acid electrolyte.

Summarizing, the manufacturing steps for a typical carbon fiber paper-based gas diffusion media typically include: (1) a carbon fiber paper manufacturing step; (2) an impregnation step using resin and fillers; (3) a resin curing step sometimes done with applied pressure; and (4) a carbonization/graphitization step. The carbon fiber paper manufacturing and impregnation steps are typically continuous, whereas the molding, carbonization and graphitization steps may be either batch or continuous. For example, one specific process includes the following steps: (1) a providing of polyacrylonitrile (PAN) fibers step; (2) a carbonization and chopping of the fibers step; (3) a paper making step, including adding 5-15% binder; (4) a resin impregnation step using phenolic resin; (5) a molding step; and (6) a carbonization/graphitization step.

The resin, typically phenolic, that is used to bond the structure together is conventionally applied during the separate impregnation step via a solution, with the solvent being driven off in high velocity ovens. However, all of these separate manufacturing and processing steps are time-consuming and costly.

Accordingly, there exists a need for new and improved gas diffusion media for PEM fuel cell systems.

SUMMARY OF THE INVENTION

In accordance with the general teachings of the present invention, new and improved gas diffusion media for PEM fuel cell systems are provided.

In accordance with one embodiment of the present invention, a gas diffusion layer for use in fuel cells is provided, comprising: (1) a mat comprised of plurality of carbon fibers; and (2) a plurality of acrylic pulp fibers incorporated into the carbon fiber mat, wherein the acrylic pulp fibers are cured and carbonized after incorporation into the carbon fiber mat.

In accordance with one aspect of the present invention, the carbon fibers are present in a range of about 25 to about 50 weight percent based on the total weight of the gas diffusion layer prior to curing and carbonization. In accordance with another aspect of the present invention, the carbon fibers are present in an amount of about 35 weight percent based on the total weight of the gas diffusion layer prior to curing and carbonization.

In accordance with one aspect of the present invention, the acrylic pulp fibers are present in a range of about 50 to about 75 weight percent based on the total weight of the gas diffusion layer prior to curing and carbonization. In accordance with another aspect of the present invention, the acrylic pulp fibers are present in an amount of about 65 weight percent based on the total weight of the gas diffusion layer prior to curing and carbonization.

In accordance with one aspect of the present invention, the carbon fibers added to the pre-carbonized mat are present in a range of about 40 to about 70 weight percent based on the total weight of the gas diffusion layer after the curing and carbonization step. In accordance with another aspect of the present invention, the carbonized acrylic fibers are present in a range of about 30 to about 60 weight percent based on the total weight of the gas diffusion layer after the curing and carbonization step.

In accordance with one aspect of the present invention, the gas diffusion layer is graphitized (e.g., greater than 90% carbon). In accordance with another aspect of the present invention, the gas diffusion media is incorporated into a proton exchange membrane fuel cell.

In accordance with a first alternative embodiment of the present invention, a gas diffusion layer for use in fuel cells is provided, comprising: (1) a mat comprised of a plurality of carbon fibers; and (2) a plurality of acrylic pulp fibers incorporated into the carbon fiber mat, wherein the acrylic pulp fibers are cured and carbonized after incorporation into the carbon fiber mat, wherein the carbon fibers are present in a range of about 25 to about 50 weight percent based on the total weight of the gas diffusion layer prior to being cured and carbonized, wherein the acrylic pulp fibers are present in a range of about 50 to about 75 weight percent based on the total weight of the gas diffusion layer prior to being cured and carbonized.

In accordance with one aspect of the present invention, the carbon fibers are present in an amount of about 35 weight percent based on the total weight of the gas diffusion layer prior to curing and carbonization.

In accordance with one aspect of the present invention, the acrylic pulp fibers are present in an amount of about 65 weight percent based on the total weight of the gas diffusion layer prior to curing and carbonization.

In accordance with one aspect of the present invention, the carbon fibers added to the pre-carbonized mat are present in a range of about 40 to about 70 weight percent based on the total weight of the gas diffusion layer after the curing and carbonization step. In accordance with another aspect of the present invention, the carbonized acrylic fibers are present in a range of about 30 to about 60 weight percent based on the total weight of the gas diffusion layer after the curing and carbonization step.

In accordance with one aspect of the present invention, the gas diffusion layer is graphitized (e.g., greater than 90% carbon). In accordance with another aspect of the present invention, the gas diffusion media is incorporated into a proton exchange membrane fuel cell.

In accordance with a second alternative embodiment of the present invention, a method for forming a gas diffusion layer for use in fuel cells, comprising: (1) providing a plurality of carbon fibers; (2) providing a plurality of acrylic pulp fibers; (3) combining the acrylic pulp fibers and the carbon fibers to form a mat; and (4) curing and carbonizing the acrylic fibers.

In accordance with one aspect of the present invention, the carbon fibers are present in a range of about 25 to about 50 weight percent based on the total weight of the gas diffusion layer prior to curing and carbonization. In accordance with another aspect of the present invention, the carbon fibers are present in an amount of about 35 weight percent based on the total weight of the gas diffusion layer prior to curing and carbonization.

In accordance with one aspect of the present invention, the acrylic pulp fibers are present in a range of about 50 to about 75 weight percent based on the total weight of the gas diffusion layer prior to curing and carbonization. In accordance with another aspect of the present invention, the acrylic pulp fibers are present in an amount of about 65 weight percent based on the total weight of the gas diffusion layer prior to curing and carbonization.

In accordance with one aspect of the present invention, the carbon fibers added to the pre-carbonized mat are present in a range of about 40 to about 70 weight percent based on the total weight of the gas diffusion layer after the curing and carbonization step. In accordance with another aspect of the present invention, the carbonized acrylic fibers are present in a range of about 30 to about 60 weight percent based on the total weight of the gas diffusion layer after the curing and carbonization step.

In accordance with one aspect of the present invention, the gas diffusion layer is graphitized (e.g., greater than 90% carbon). In accordance with another aspect of the present invention, the gas diffusion media is incorporated into a proton exchange membrane fuel cell.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the preferred is merely exemplary in nature and is in no way intended to limit the invention, its application, or uses.

In accordance with the general teachings of the present invention, a carbonizable acrylic pulp, which replaces the phenolic resin binder in a conventional impregnation step, acts as the binder material, and is mixed with a carbon fiber dispersion during the paper-making step. This eliminates the added cost of a phenolic resin impregnation step (including solvent removal and burn-off). Through careful post-curing and carbonization, a novel gas diffusion layer has been fabricated.

Figure 1:
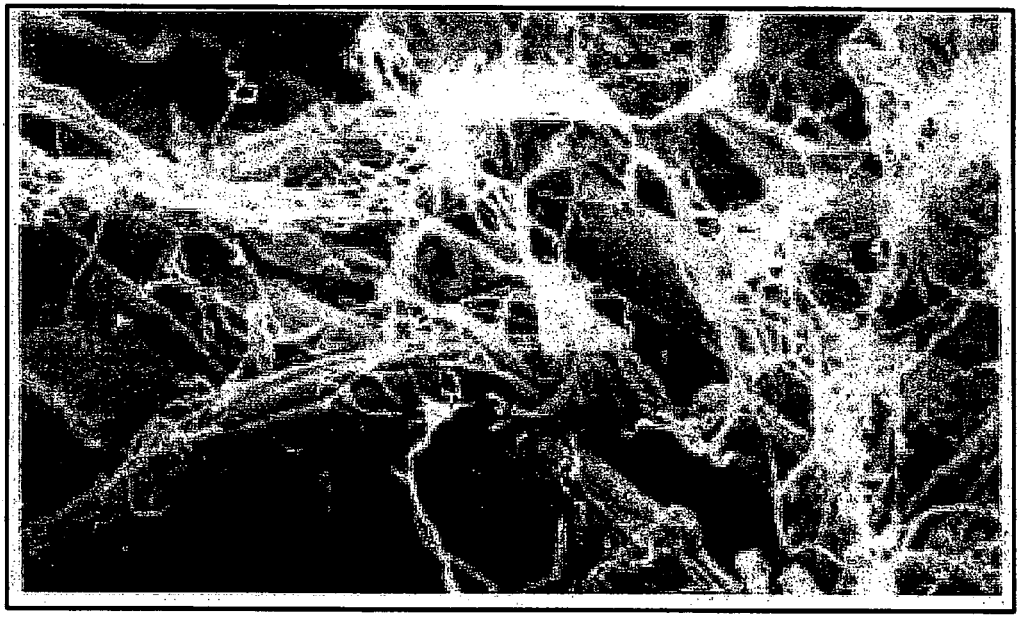
FIG. 1 is a photomicrographic view of fibrillated acrylic pulp fibers, in accordance with the prior art.

The feasibility of this approach has been demonstrated to date both in terms of manufacturing and fuel cell performance. The fibrillated acrylic pulp of the present invention is generally used as "particle catchers" in the paper industry and is readily commercially available from numerous sources. In accordance with one aspect of the present invention, the acrylic pulp of the present invention are bundles of very fine acrylic fibers (e.g., see FIG. 1) such as those readily commercially available from Sterling Fibers (Pace, Florida). When added into water, these pulps will "bloom," thus creating a network of very fine fibers (e.g., 100-200 nanometer diameters).

The gas diffusion media of the present invention is produced according to the following general process.

Initially, prior to paper formation, carbon fibers (e.g., SGL Carbon Group (Wiesbaden, Germany) SIGRAFIL C® C30) having fiber diameters of approximately 7 microns are chopped into predetermined lengths, such as, for example, about 5 to about 7 millimeter lengths or any length sufficient for a paper making process.

The paper making process is performed using the chopped predetermined length carbon fibers being dispersed in water with the acrylic fiber pulp (e.g., Acordis BV, (Arnhem, The Netherlands), high tension (HT) acrylic fibers, beaten to Canadian Standard Freeness (CSF) 240, 6 mm×12 d), with the dispersion of fiber being as low as about 1 to about 5 percent by weight. Although the acrylic fibers are intended to function as a binder, it should be appreciated that other materials, such as additional binders, can also be added to the dispersion, e.g., 5 to 15 weight percent of polyvinyl alcohol (PVA) with respect to the solid material content in the dispersion. In addition, in order to form a uniform dispersion, a small amount of non-ionic surfactant, such as TRITON X-100, can be added to the dispersion. In accordance with an aspect of the present invention, the acrylic fibers are carbonizable, in that at least 30 weight percent of the acrylic fibers remain after a carbonizing step.

The dispersion is then dropped onto a porous drum or wire screen with a vacuum dryer to remove the water. The web is then dried in an oven or on heated drums. The web is then rolled up into rolls. The web typically has an area weight of about 100 to about 130 gm/m².

The carbon fiber paper is then compression molded and fully cured by exposing the carbon fiber paper, under pressure of about 150 to about 300 psi, first under a lower temperature, e.g., 120 to 175° C. to fuse the acrylic fibers for 1 to 2 minutes, and then to a higher temperature up to 250° C. for about 1 to 2 minutes to cure the acrylic fibers. The fiber paper is thus molded to a desired thickness and density.

Finally, a heat treatment step is performed for carbonizing the molded paper by heating the paper to a carbonizing temperature. Typically, this temperature will range from between 1300° C. and 2400° C. Because the acrylic fibers are carbonizable, at least 30 weight percent of the acrylic fiber remains after the carbonizing step.

In accordance with one aspect of the present invention, the carbon fibers are present in a range of about 25 to about 50 weight percent based on the total weight of the gas diffusion layer prior to curing and carbonization. In accordance with another aspect of the present invention, the carbon fibers are present in an amount of about 35 weight percent based on the total weight of the gas diffusion layer prior to curing and carbonization.

In accordance with one aspect of the present invention, the acrylic pulp fibers are present in a range of about 50 to about 75 weight percent based on the total weight of the gas diffusion layer prior to curing and carbonization. In accordance with another aspect of the present invention, the acrylic pulp fibers are present in an amount of about 65 weight percent based on the total weight of the gas diffusion layer prior to curing and carbonization.

In accordance with one aspect of the present invention, the carbon fibers added to the precarbonized mat are present in a range of about 40 to about 70 weight percent based on the total weight of the gas diffusion layer after the curing and carbonization step. In accordance with another aspect of the present invention, the carbonized acrylic fibers are present in a range of about 30 to about 60 weight percent based on the total weight of the gas diffusion layer after the curing and carbonization step.

In accordance with one aspect of the present invention, the gas diffusion media is incorporated into a proton exchange membrane fuel cell.

Figure 2:
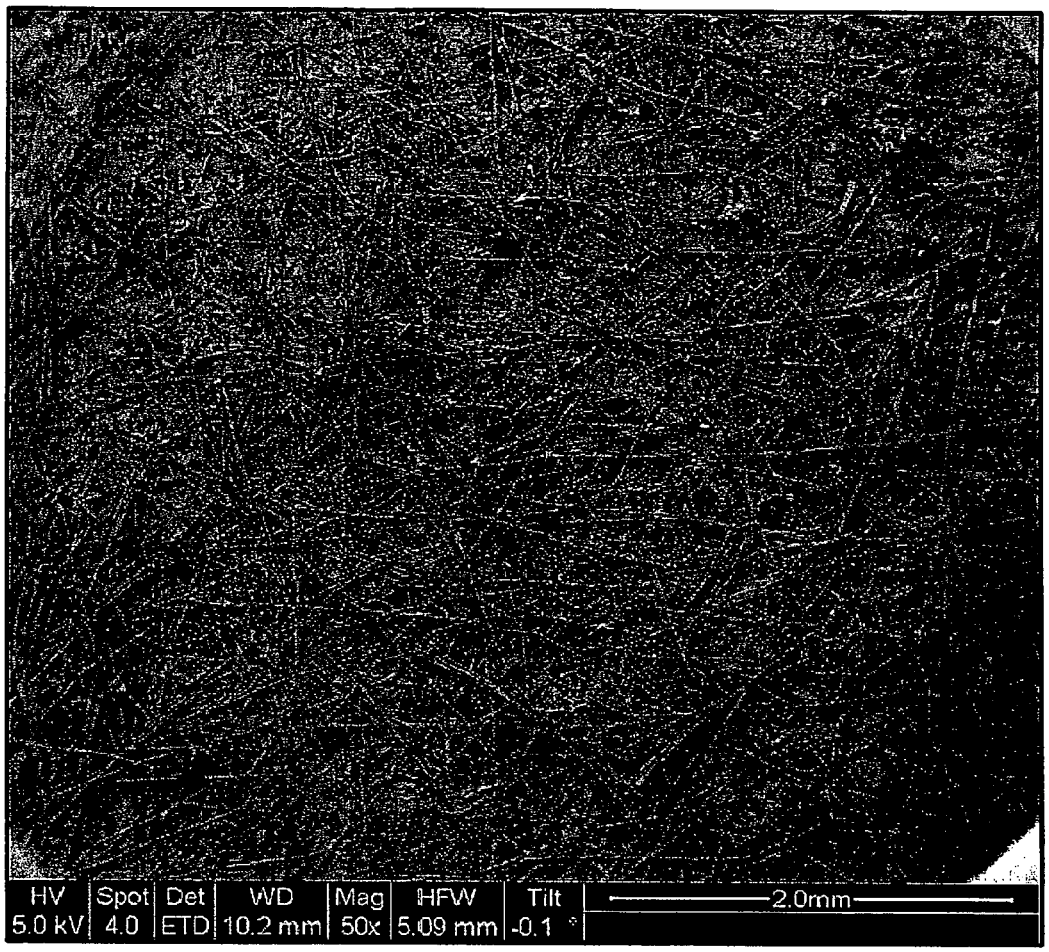
FIG. 2 is a low magnification (50×) photomicrographic view of a gas diffusion media, in accordance with the general teachings of the present invention.
Figure 3:
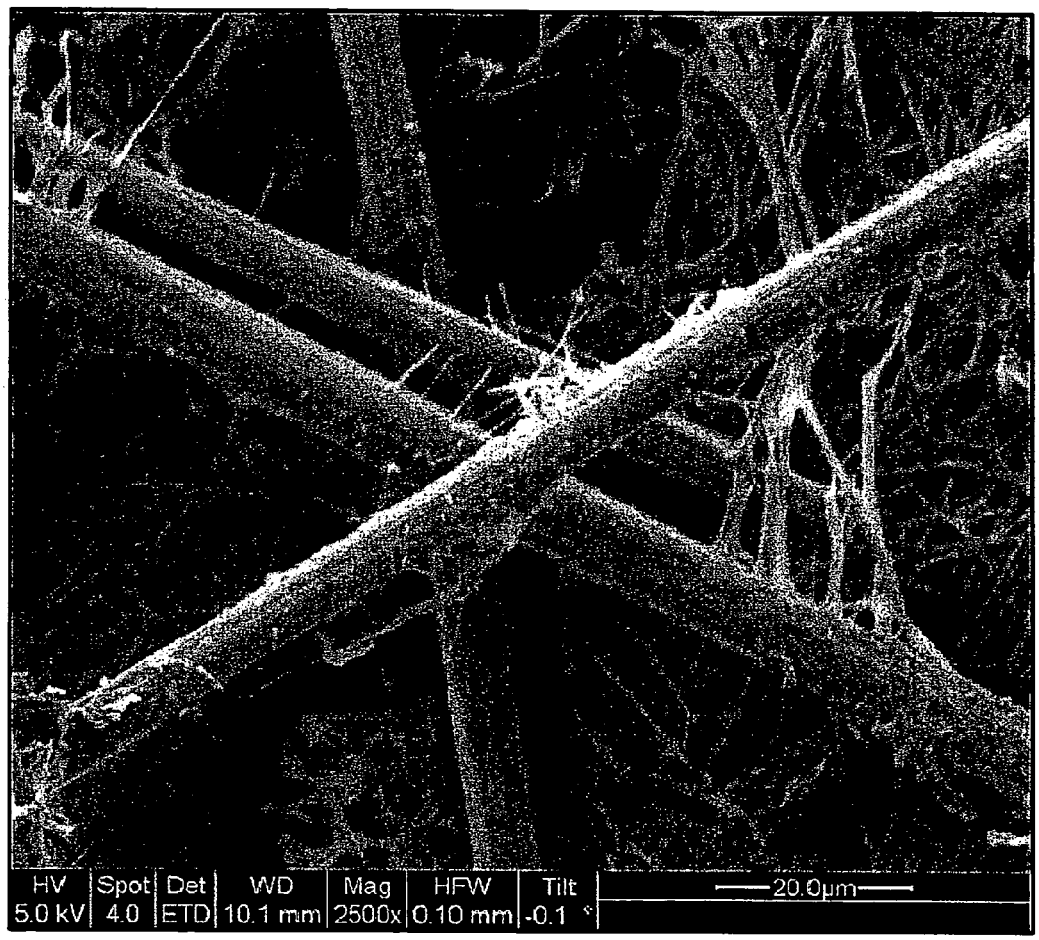
FIG. 3 is a high magnification (2500×) photomicrographic view of a gas diffusion media, in accordance with the general teachings of the present invention.

FIGS. 2 and 3 show SEM images of the gas diffusion media prepared in accordance with the general teachings of the present invention. The low magnification SEM image (i.e., FIG. 2) shows that the surface of the GDL is covered with the carbonized acrylic fibers, while the higher magnification SEM image (i.e., FIG. 3) shows the carbonized fibrillated acrylic structure. The sample was prepared using 65 weight percent acrylic fiber (e.g., Acordis BV, Arnhem, The Netherlands), high tension (HT) acrylic fibers, beaten to Canadian Standard Freeness (CSF) 240, 6 mm×1.2 d) and 35 weight percent carbon fibers (e.g., SGL Carbon Group (Wiesbaden, Germany) SIGRAFIL C® C30). By way of a non-limiting example, the acrylic fibers of the present invention can be comprised of fibers having a CSF in the range of about 100 to about 450.

Figure 4:
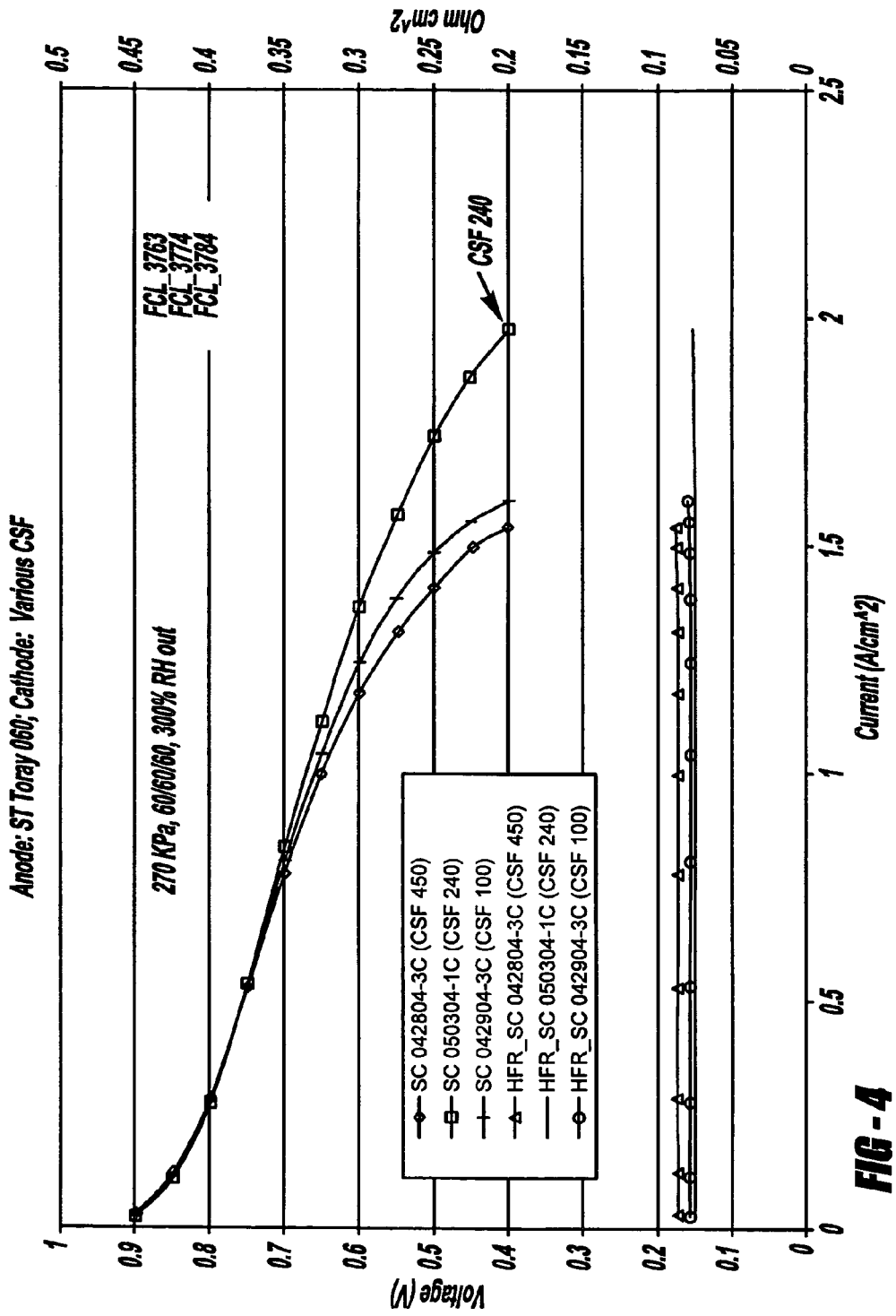
FIG. 4 is a graphical view of the potential versus current density characteristics of a series of fuel cell samples containing a gas diffusion media produced in accordance with the general teachings of the present invention under wet operating conditions.
Figure 5:
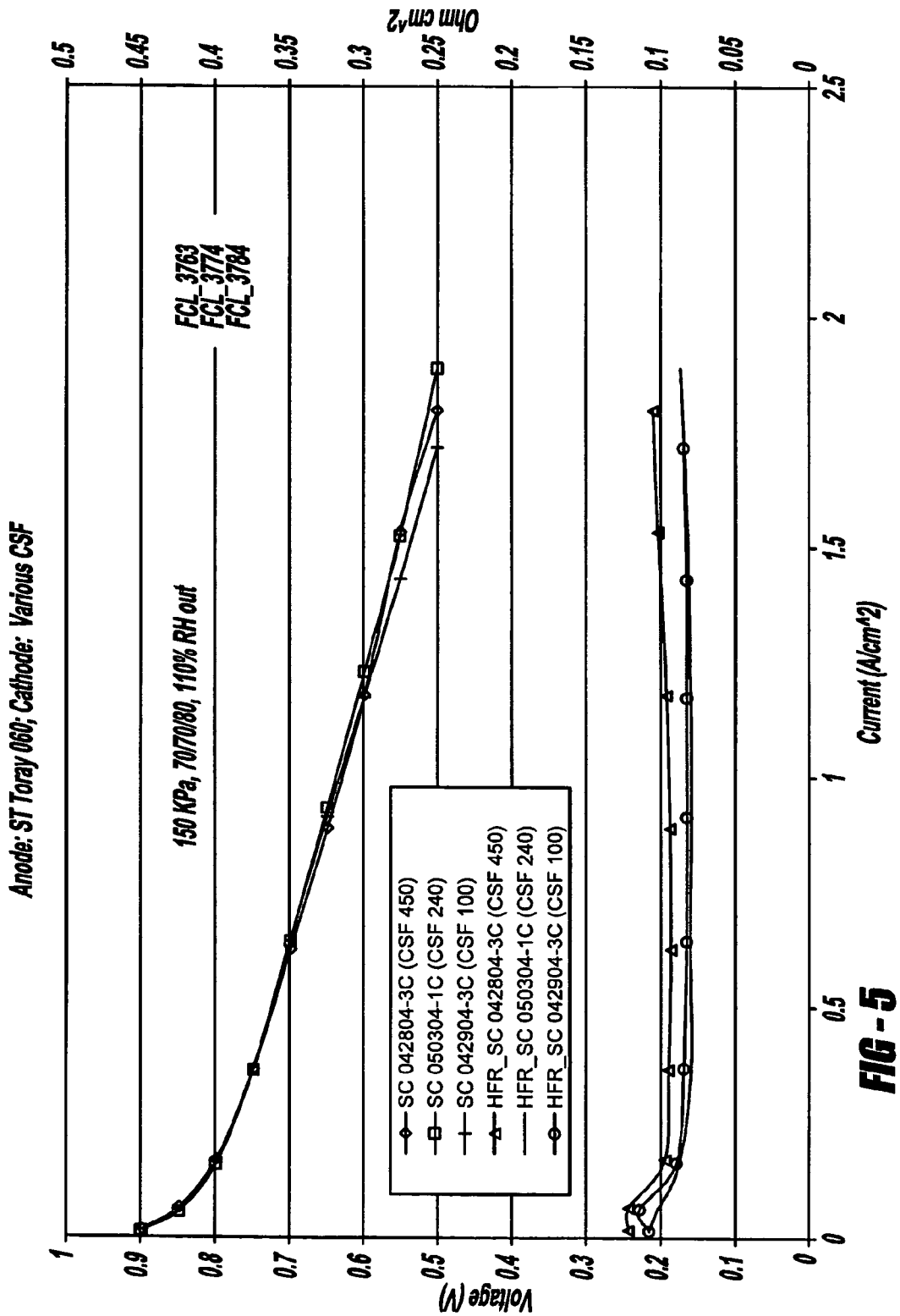
FIG. 5 is a graphical view of the potential versus current density characteristics of the same series of fuel cell samples of FIG. 4 under dry operating conditions.

To determine the potential versus current density characteristics of a fuel cell incorporating a gas diffusion media produced in accordance with the general teachings of the present invention, 50 cm² testing was performed on three samples, as shown in FIGS. 4 and 5. In both cases, the diffusion media of the present invention was employed on the cathode side of the fuel cell, where the water management requirements of the diffusion media are most severe. A conventional diffusion media (TORAY TGPH-060) treated with 7 weight percent poly[tetrafluoroethylene] was employed as the anode diffusion media, and a commercial catalyst-coated membrane was employed (25 micron membrane, 0.4 mg Pt/cm$^2$ on the anode and 0.4 mg Pt/cm$^2$ on the cathode, Gore 5510 from W. L. Gore, Elkton, Md.). In FIG. 4, testing was done at an absolute pressure of 270 kilopascals (kPa), a temperature of 60° C. with both the anode and cathode dew points at 60° C. which results in about 300% relative humidity (RH) at the gas outlet. In FIG. 5, testing was done at a pressure of 50 KPa, a temperature of 80° C. with both the anode and cathode dew points at 70° C. which results in about 110% relative humidity (RH) at the gas outlet. In both cases the hydrogen and air flow rates were maintained at twice the stoichiometric requirement based on the fuel cell current density.

As FIGS. 4 and 5 clearly show, the potential versus current density characteristics of the fuel cell samples having the gas diffusion media produced in accordance with the general teachings of the present invention were quite satisfactory and comparable to the best diffusion media available. As can also be seen, excellent fuel cell performance was achieved even without the addition of a conventionally used microporous layer (e.g., MPL, carbon powder bound by a hydrophobic polymer) on the substrate. Without being bound to a particular theory of the operation of the present invention, it is believed that the carbonized acrylic pulp fibers affect the pore structure of the final carbon fiber paper substrate and thus may behave like an MPL. As such, comparable fuel cell performance to state-of-the-art gas diffusion media has been achieved by using gas diffusion media prepared in accordance with the general teachings of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gas diffusion layer for use in fuel cells, comprising:
a mat comprised of plurality of carbon fibers; and
a plurality of acrylic pulp fibers incorporated into the carbon fiber mat;
wherein the acrylic pulp fibers are cured and carbonized after incorporation into the carbon fiber mat, and wherein the carbon fibers are present in a range of about 25 to about 50 weight percent based on the total weight of the gas diffusion layer prior to curing and carbonization.

2. The invention according to claim 1, wherein the carbon fibers are present in an amount of about 35 weight percent based on the total weight of the gas diffusion layer prior to curing and carbonization.

3. The invention according to claim 1, wherein the acrylic pulp fibers are present in a range of about 50 to about 75 weight percent based on the total weight of the gas diffusion layer prior to curing and carbonization.

4. The invention according to claim 1, wherein the acrylic pulp fibers are present in an amount of about 65 weight percent based on the total weight of the gas diffusion layer prior to curing and carbonization.

5. The invention according to claim 1, wherein the carbon fibers added to the pre-carbonized mat are present in a range of about 40 to about 70 weight percent based on the total weight of the gas diffusion layer after the curing and carbonization step.

6. The invention according to claim 1, wherein the carbonized acrylic fibers are present in a range of about 30 to about 60 weight percent based on the total weight of the gas diffusion layer after the curing and carbonization step.

7. The invention according to claim 1, wherein the gas diffusion layer is incorporated into a proton exchange membrane fuel cell.

8. A gas diffusion layer for use in fuel cells, comprising:
a mat comprised of a plurality of carbon fibers; and
a plurality of acrylic pulp fibers incorporated into the carbon fiber mat;
wherein the acrylic pulp fibers are cured and carbonized after incorporation into the carbon fiber mat;
wherein the carbon fibers are present in a range of about 25 to about 50 weight percent based on the total weight of the gas diffusion layer prior to being cured and carbonized;
wherein the acrylic pulp fibers are present in a range of about 50 to about 75 weight percent based on the total weight of the gas diffusion layer prior to being cured and carbonized.

9. The invention according to claim 8, wherein the carbon fibers are present in an amount of about 35 weight percent based on the total weight of the gas diffusion layer prior to curing and carbonization.

10. The invention according to claim 8, wherein the acrylic pulp fibers are present in an amount of about 65 weight percent based on the total weight of the gas diffusion layer prior to curing and carbonization.

11. The invention according to claim 8, wherein the carbon fibers added to the pre-carbonized mat are present in a range of about 40 to about 70 weight percent based on the total weight of the gas diffusion layer after the curing and carbonization step.

12. The invention according to claim 8, wherein the carbonized acrylic fibers are present in a range of about 30 to about 60 weight percent based on the total weight of the gas diffusion layer after the curing and carbonization step.

13. The invention according to claim 8, wherein the gas diffusion layer is incorporated into a proton exchange membrane fuel cell.

14. A method for forming a gas diffusion layer for use in fuel cells, comprising:
providing a plurality of carbon fibers;
providing a plurality of acrylic pulp fibers;
combining the acrylic pulp fibers and the carbon fibers to form a mat; and
curing and carbonizing the acrylic fibers, wherein the carbon fibers are present in a range of about 25 to about 50 weight percent based on the total weight of the gas diffusion layer prior to curing and carbonization.

15. The invention according to claim 14, further comprising graphitizing the gas diffusion layer.

16. The invention according to claim 14, wherein the carbon fibers are present in an amount of about 35 weight percent based on the total weight of the gas diffusion layer prior to curing and carbonization.

17. The invention according to claim 14, wherein the acrylic pulp fibers are present in a range of about 50 to about 75 weight percent based on the total weight of the gas diffusion layer prior to curing and carbonization.

18. The invention according to claim 14, wherein the acrylic pulp fibers are present in an amount of about 65 weight percent based on the total weight of the gas diffusion layer prior to curing and carbonization.

19. The invention according to claim 14, wherein the carbon fibers added to the pre-carbonized mat are present in a range of about 40 to about 70 weight percent based on the total weight of the gas diffusion layer after the curing and carbonization step.

20. The invention according to claim 14, wherein the carbonized acrylic fibers are present in a range of about 30 to about 60 weight percent based on the total weight of the gas diffusion layer after the curing and carbonization step.

21. The invention according to claim 14, wherein the gas diffusion layer is incorporated into a proton exchange membrane fuel cell.

22. A gas diffusion layer for use in fuel cells, comprising:
a mat comprised of plurality of carbon fibers; and
a plurality of acrylic pulp fibers incorporated into the carbon fiber mat;
wherein the acrylic pulp fibers are cured and carbonized after incorporation into the carbon fiber mat, and wherein the acrylic pulp fibers are present in a range of about 50 to about 75 weight percent based on the total weight of the gas diffusion layer prior to curing and carbonization.

* * * * *

UNITED STATES PATENT AND TRADEMARK OFFICE
CERTIFICATE OF CORRECTION

| | | |
|---|---|---|
| PATENT NO. | : 8,343,452 B2 | Page 1 of 1 |
| APPLICATION NO. | : 11/384706 | |
| DATED | : January 1, 2013 | |
| INVENTOR(S) | : Ji et al. | |

It is certified that error appears in the above-identified patent and that said Letters Patent is hereby corrected as shown below:

On the Title page, Item [73] Assignee should read:

Spectracorp, Shelton, CT. (US)

Signed and Sealed this
Twenty-second Day of April, 2014

Michelle K. Lee
*Deputy Director of the United States Patent and Trademark Office*